Aug. 23, 1932.  O. S. SELLS  1,873,220
MACHINE FOR GRADING GLOBULAR ARTICLES
Filed Feb. 24, 1925  3 Sheets-Sheet 1
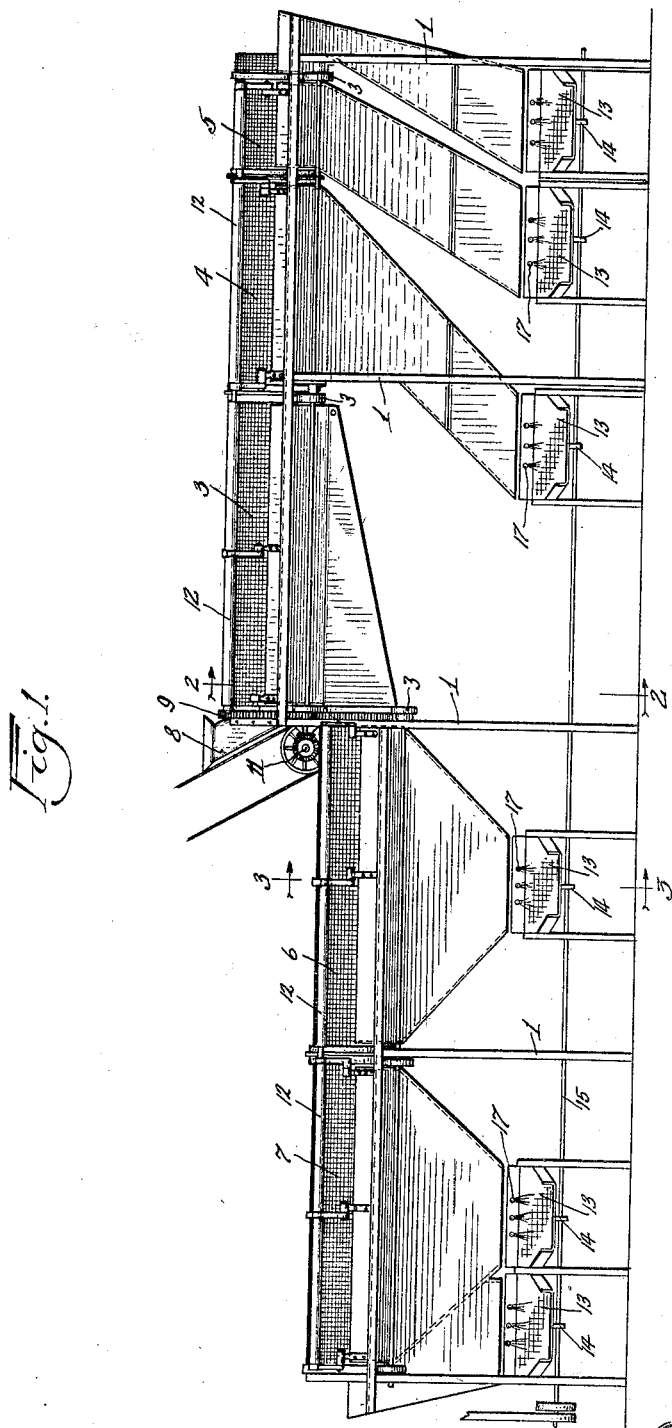

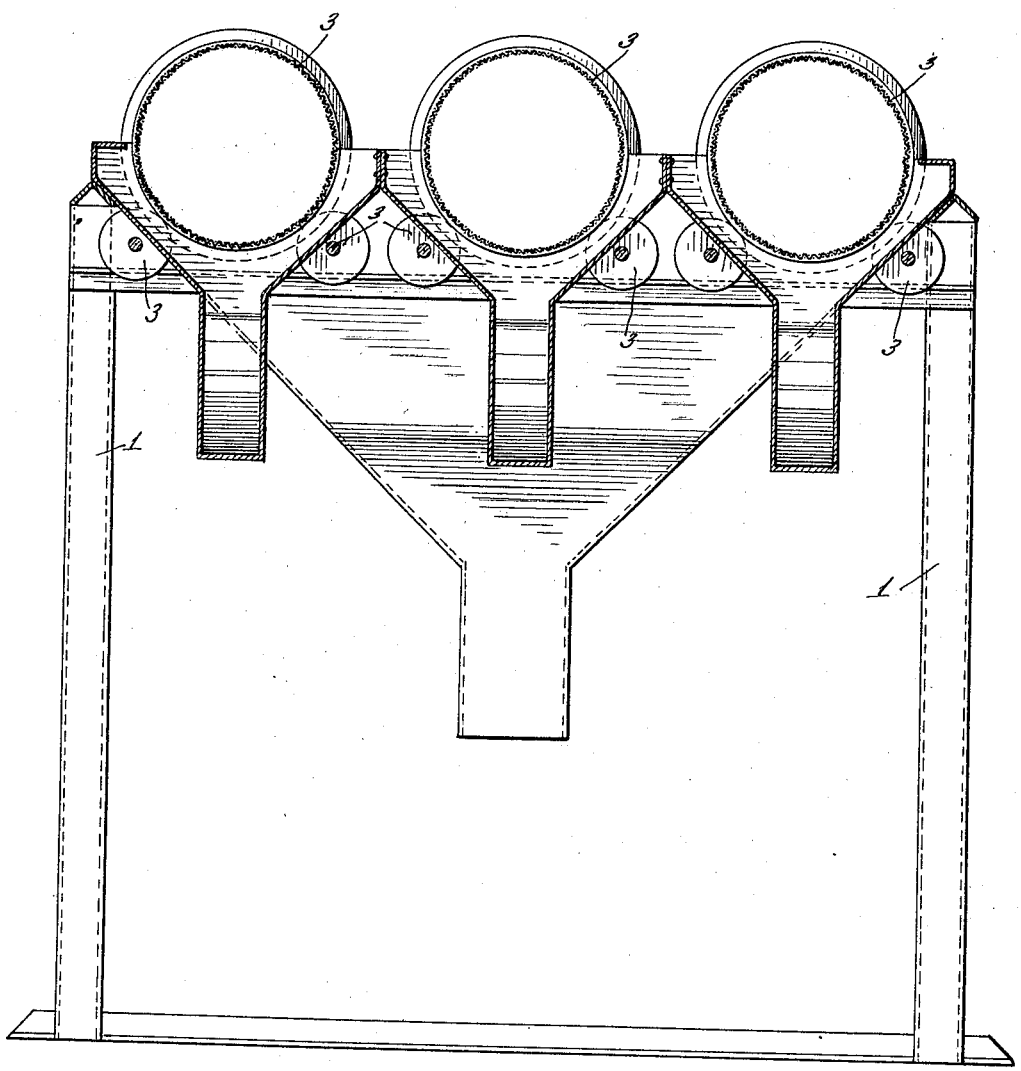

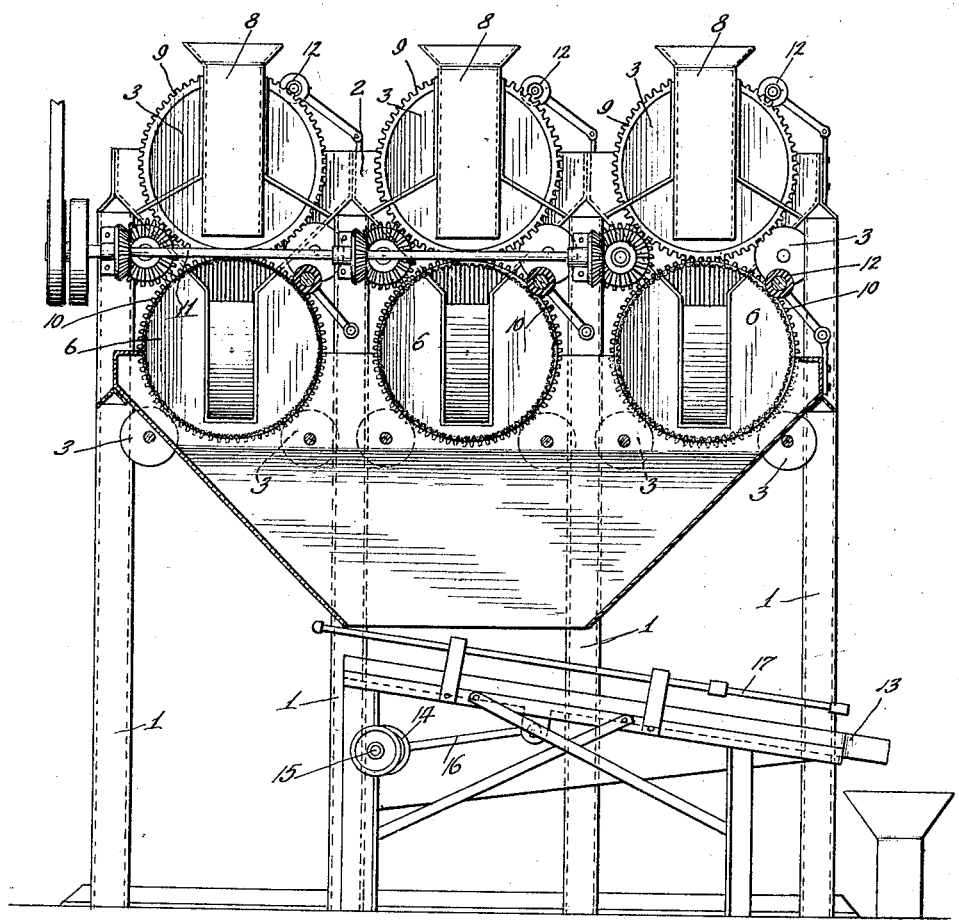

Patented Aug. 23, 1932

1,873,220

UNITED STATES PATENT OFFICE

OGDEN S. SELLS, OF HOOPESTON, ILLINOIS, ASSIGNOR TO SPRAGUE-SELLS CORPORATION, OF HOOPESTON, ILLINOIS

MACHINE FOR GRADING GLOBULAR ARTICLES

Application filed February 24, 1925. Serial No. 11,206.

This invention relates to a method and unitary apparatus for treating globular articles of vegetative growth for canning purposes and is particularly adapted to rapidly and efficiently grade and wash green peas and the like while they are in continuous movement in separate and distinct streams.

Referring particularly to green peas as handled in canning factories, it will help materially to differentiate the manifold advantages and importance of my invention if I give a brief description of the present method and apparatus for handling this and similar products.

Green peas are gathered from the fields by means of cutting the vines with the pods attached and hauling them in bulk to the canning factory where they are placed in a large machine that is technically known as a "viner".

This machine manipulates the vines and pods in a manner to break the pods and release the peas which roll down and out of the machine where they accumulate in bulk and mixed sizes.

In passing this mass of peas through a canning line they are treated by what is termed a "grader", by means of which they are supposed to be separated into the grades commercially known as 1s, 2s, 3s, 4s, 5s and 6s.

The present most generally used machine for this purpose is known as the "Collosus", and comprises a very large, long, revolving perforated cylinder in the neighborhood of 60 inches in diameter.

The perforations at the end where the peas enter are the smallest and are of a size to permit the small No. 1 select and tenderest peas to pass quickly through and thus protect them from possible mutilation and crushing from rolling around with the larger and more hardened product.

The perforations in this cylinder grow gradually larger toward the exit end, so that, in theory at least, the various sizes of peas will find the first openings through which they may freely pass and thus be automatically graded into the commercial sizes noted.

In practice, however, the grading by this method and this machine falls far short of theory and expectation.

It is about normal operation for a pea canning factory to run 100 No. 2 cans per minute. This speed requires that the machines constituting a pea canning line produce a sufficient number of peas of the various sizes to permit of continuous operation.

The grader, therefore, must continuously handle a considerable bulk of mixed peas and a certain speed of rotation must be given to the large circular screen to produce the grades in such quantities as are needed.

It is found in practice that the mass of mixed peas passing into and through the grader have a decided tendency to climb up the side of the rotating screen and then tumble back over each other. The rotary screen being inclined toward the exit end the mass of mixed, rolling and tumbling peas gradually work downward toward the low end of the screen, but instead of moving down in a comparatively straight path, the mass of moving peas follows a more or less sinuous path which adds somewhat to the difficulties of separation by this method.

Since a considerable quantity of peas passes through the grader in a continuous stream, the small No. 1 peas that bring the highest price, are more or less entrapped in the mass and many fail to find the small openings through which they are supposed to pass and are thereby carried along as far as the center of the cylinder before they finally get out, and then they are with one of the other larger grades and are lost to the canner since they will bring only the price of second or third grade peas.

This entrapping of the small tender peas in the mass also entails another loss to the canner in crushed and mutilated product, which would not occur, or would at least be very materially decreased if the small peas would have been able to get through the screen where intended.

This method of grading with its mutilation and crushing of the tender peas requires a picking table at each discharge point of the grader which materially increases the installation expense and the labor cost of handling the product, since the crushed and mutilated peas must be removed from the graded sizes or they will lower the grade.

In the canning line handling peas there is placed a machine called a "washer", through which all of the peas must pass. It is seldom that a canner will install different sizes of screens in the washer, he must therefore adopt a screen that will handle all sizes as well as they can be handled in a machine of this type. Here again the grading as to size is not as efficient as it should be, and small first grade peas are again lost by passing out with some of the lower grade.

To obviate all of the foregoing difficulties and undesirable features I have evolved the method and apparatus disclosed in this application.

The method part of the invention comprises dividing the continually moving stream of mixed peas into a multiple of smaller streams or masses and subjecting each divided mass to separate grading means, whereby each stream will then be, further subjected to a separating and grading action that will ultimately give practically a 100% separation as to size, with the minimum of loss from crushing and mutilation and then subjecting each graded size of peas to a washing and cleaning operation in a section of the unitary device especially adapted to handle most efficiently peas of just the one size flowing to each washing unit.

The apparatus part of the invention comprises a battery of comparatively small grading cylinders arranged in such operative relation that the mass of threshed mixed peas is divided into three streams and diverted into three paths of travel whereby they enter suitable hoppers that direct them to the grading screens where the 1s, 2s and 3s are divided from the previously separated mass and directed to special grading screens adapted to handle these sizes only. In thus dividing the original large mass of threshed peas into a number of smaller masses and subjecting each divided mass to screening action I am able to provide a very much greater area of screen surface for the quantity of peas being handled than has heretofore been possible without building a machine too large for practical operation.

The original mass of peas being now divided into the desired graded sizes, in this instance six, the six streams of graded peas flowing from the grading screens are directed to six washing and cleaning units each adapted to handle in the most efficient manner the particular size flowing to it, the particular feature that adapts each washing unit for one particular size being in the size of the screen opening in the washing unit.

It is a principal object of my invention, therefore, to provide a pea grading machine and method wherein the large mass of mixed size peas coming from the thresher is divided into a number of smaller masses and then subjecting each divided mass to separate screening, washing and cleaning operation.

It is a further object of my invention to provide a grading machine and method for handling and grading green peas wherein the first divided masses of peas are again divided and the divided masses subjected to screening and grading action whereby each mass contains a less number of sizes than the original mass from which they were divided.

It is a further object of my invention to provide a method and apparatus for the economical handling and grading of green peas from masses of mixed sizes comprising the passing of a multiple series of streams of mixed sizes of peas through separate paths whereby each stream is subjected to the action of a much greater screen surface than would be possible without division of the mass.

It is a further object of the invention to provide washing facilities connected with the apparatus and forming a part therewith whereby each screened size of peas will be subjected to a washing operation as it passes from the machine and thereby eliminate separate machines for this purpose.

It is also an object of the invention to provide a unitary apparatus comprising separating, grading and washing facilities, with power means connecting the various parts of the apparatus whereby the operative elements will operate in proper relation to give highest efficiency.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it to be understood that the several necessary elements and combinations constituting the same, may be varied in their proportions, placement, general relation and operative arrangement without departing from the scope and nature of the invention.

In carrying out the objects of my invention in a concrete form or machine, further objects, improvements and advantages have been evolved than have been recited, and in order to make the invention more clearly understood there are shown in the accompanying drawings means and mechanism embodying the preferred structural arrangement and the preferred disposition of the different parts and combinations, without limiting the claims to the exact details of the construction shown, in which I have simply illustrated one way of embodying the creative part or conception of the invention in a concrete form of machine. The described devices are simply embodiments of the invention which other structures might also employ and some of the parts or combinations of parts may be used without the others in different types of such machines without departure from the purview of my invention and I regard myself as entitled to such variations from the shown and described devices as fall within the scope and meaning of the claims hereto appended.

Reference now being had to the accompanying drawings a better understanding of the invention will be had with the understanding that the said drawings are more or less diagrammatic in character; are not necessarily drawn to scale, neither do they necessarily represent the best or the preferred engineering practices in connection with the construction of machines of this character, also the proportions and relation of some parts may be more or less exaggerated in size or shape to better illustrate the application of the invention to an operative machine.

Fig. 1 is a side elevation of a machine embodying my invention. This view shows clearly the longitudinal arrangement of the grading screens and their operative relation; the location of the discharge chutes from the various grading stations; the location of the washing screens and part of the power means for operating the moving elements of the machine.

Fig. 2 is a vertical cross section taken on approximately the line 2—2 of Fig. 1. This view clearly shows the lateral arrangement of the first series of separating and grading cylinder screens and their manner of mounting for rotation and the relation of the discharge chutes therefrom.

Fig. 3 is a vertical cross sectional elevation taken on approximately the line 3—3 of Fig. 1.

This view clearly shows the relative arrangement of all of the cylinder screens; their manner of geared connection for driving; the arrangements of the discharge chutes from the top cylinders to the lower ones; the agitating screened washers underneath the lower and upper cylinders; the means for cleaning the screened surfaces of the cylinders of adhering peas and the means for driving the entire apparatus.

The general arrangement of the apparatus comprises a skeleton type of frame work made up of structural iron shapes and plate members connecting the frame parts together and I would designate the whole frame structure by the numeral 1, and the connecting plate members by the numeral 2.

Mounted longitudinally of the machine are a series of freely turning supporting rollers 3a on which the sets of grading and separating cylinders rest and which maintain the cylinders in their operative relation.

In the drawings I show a machine having six long cylinders mounted in sets of three. The first set of three are mounted somewhat above the others as shown in Figs. 1 and 3, the lower set being longitudinally advanced from the other set, the reason for which will be described further on.

The top set of cylinder screens are arranged for three distinct sets of operations and the sections of the cylinders comprising these operations I will designate by the numerals 3, 4, and 5. The lower set of cylinders are arranged for two distinct sets of operations and I will designate these by the numerals 6 and 7.

In front of each of the upper cylinders are receiving hoppers 8 discharging into the individual cylinders.

The front ends of the cylinders 3 are provided with ring gears 9, meshing with like ring gears 10 on the adjacent ends of the lower set of cylinders. A combination bevel and spur gear is arranged adjacent the ends of the cylinders 3, the spur gear meshing with the ring gears 9 and the bevels meshing with companion gears on the cross shaft 11 mounted on the frame work of the machine and driven by the belt and pulley as shown.

In the grading and screening of mixed sizes of peas there are some of a size that will almost pass through a certain hole. These are likely to become wedged in such a hole and unless forcibly removed remain therein and thus reduce the screening area of the cylinder. To forcibly remove these I place rollers 12 on the outside of each cylinder and mount them for free rotation in such a manner that they will contact with any peas wedged in the holes and force them back into the cylinders.

Arranged underneath each of the sets of cylinders are discharge chutes leading to the washing stations. Each washing station constitutes a vibrating screen onto which the screened and graded peas fall. I will designate all of the washing stations by the numeral 13. These vibrating washing screens are mounted as shown in Fig. 3 and agitated by means of an eccentric 14 on the longitudinal shaft 15 and the connecting rods 16 pivotally connected with the under side of each screen, the shaft 15 being driven in the manner shown. Arranged over each washing screen is a water pipe 17, or rather a series of pipes adapted to spray the stream of moving peas with sufficient water to give them a thorough cleansing.

*Operation*

The operation of my improved pea grader would be about as follows with the arrangement of elements shown. With a different arrangement the operation may differ somewhat.

In the canning line when it becomes necessary to grade the peas as to size, the mass of moving peas is divided into three streams in any well known manner and each stream discharged into one of the chutes 8 of my improved grader.

The first, and a very important part of my method, of grading the peas consists in separating the peas belonging to the highest commercial grades, viz., the 1s, 2s and 3s from the general mass and grade and separate them by themselves.

There are several reasons for doing this.

These three grades bring the highest prices in the market and they comprise the smallest and tenderest peas. On account of the price it is desirable to get as perfect a grading as is possible and on account of their tender nature it is desirable to keep them from mutilation as much as possible so as to get a greater quantity of perfect peas of the highest grades. By this separation and separate grading they can be subjected to a greater screen surface and a much finer grading thereby be effected.

The sections 3 of the upper sets of grading cylinders have perforations large enough to pass these first three grades in mass and thus quickly separate them from the larger and more mature and harder peas and thus is prevented much of the crushing and mutilation incident to the entire mass rolling and tumbling as in the ordinary type of single grader.

The peas released from the portion 3 of the top cylinders pass into the conveying chute under this portion of the cylinders and are discharged into the first section of the lower cylinders 6. The screen perforations in this section of the lower cylinders are only large enough to pass the smallest or first grade peas. These drop into the conveying chute under this section and drop onto the washing screens where they are cleansed and then pass into suitable receptacles or onto a conveyor and are further disposed of.

The peas of the second and third grade that have passed over the perforations that passed the first grade pass on down the cylinders into the section 7 where the perforations are just large enough to pass the second grade. These peas in passing through the screen fall into the chute under this section and pass onto the washing screen and are thoroughly cleansed and are then passed on down the line for further manipulation.

The No. 3 peas that could not get through either of the screens pass out the ends of the lower cylinders, down the chute at this station and drop onto the washer arranged for their reception and are in turn washed and passed on down the canning line.

The peas in the top set of cylinders that could not get through the first screen with the 1s, 2s and 3s pass on down the cylinders until they encounter the section 4 which has perforations suitable to pass the No. 4 grade.

These fall through the perforations into the chute underneath and pass onto the washer at this station and are cleansed and passed on down the line.

The next grade, the 5s are let through the screen 5 and are treated likewise, while the 6s pass out the end of the cylinders and onto the washer stationed for their reception and the operation is completed.

It is easily seen that my improved method and apparatus will effect a much finer and closer grading than has before been possible and will thereby give to the canner a much larger proportion of the first grade and quality peas than has heretofore been possible or practical. Also by separating the original mass of peas into three or more streams a much smaller quantity is handled by each screen and I have found that the peas pass down the slightly inclined cylinders in a much straighter path than where a greater number are handled in one mass and that the rolling and tumbling is much reduced and thereby the mutilation and crushing is greatly eliminated.

In the operation of this improved method and apparatus in actual canning factories I have found that the loss from mutilation and crushing is so reduced that only one picking table with four to six operators is needed to handle all grades, while with the large single grader a picking table for each grade, or six in all, was needed to handle the product, therefore, the labor cost for this one operation has been reduced very materially.

This combination grading and washing machine has proven especially advantageous on account of the fact that with a proper size opening for the washing screens a much cleaner article is produced than can be obtained by hand picking in addition to the labor saving in this connection, and further on account of dividing the full load into six parts each washing screen has a much better opportunity to properly handle its product as it flows to them in a regular stream from the grading screens.

What I claim as new and desire to secure by Letters Patent is:

1. In grading machines for green peas and the like, a grading reel rotating on a substantially horizontal axis and having a plurality of sections for separating the different grades from a mass of mixed grades of peas, an annular gear on one end of said reel, another grading reel located adjacent said first reel with means for directing peas from said first reel to said second reel and an annular gear on said second reel meshing with the gear on said first reel with power means for rotating said reels.

2. In grading machines for green peas and the like, a grading reel rotating on substantially a horizontal axis and having perforations therein for separating peas, an annular gear on said reel, another grading reel located in tandem with said first reel and having an annular gear meshing with the gear of the first reel, with power means for rotating said reels.

3. An apparatus for grading peas comprising a series of grading cylinders each provided with a plurality of grading sections adapted to pass peas of differing sizes, pairs of said cylinders arranged substantially end to end, means for supplying a mass of mixed grades of peas to the median end of one of said cylinders of a pair for an initial separation where several of the smaller sizes pass through the first grading section of said cylinders, conveyors for collecting and carrying these smaller sizes to the median ends of the other of said end to end cylinders the separated groups of peas passing along said cylinders for further separation, separate conveyors for collecting the separated groups from each of said cylinders, a series of screening and washing stations to which said groups of peas are passed by said collecting conveyors, vibrating screen members at each of said stations with means for vibrating said screen members to remove by a screening separation undesirable matter from the group masses, with means at each of said stations to spray a cleansing liquid on the tops of said screen members to assist in the cleansing and final separation.

4. A unitary device for grading and washing green peas for canning purposes comprising a series of grading cylinders each provided with a plurality of grading sections adapted to pass peas of varying sizes, pairs of said cylinders arranged substantially end to end but with their axes slightly out of alignment vertically, means for supplying a mass of mixed grades of peas to the median end of the upper of said end to end cylinders for an initial separation where several of the smaller sizes in the mixed mass pass through the reticulations of the first grading section, gravity chutes for collecting said initial separation and conveying them to the median end of the lower of said end to end cylinders, the two said groups now passing along the said cylinders for further separation but traveling in opposite directions, separate gravity chutes for collecting the separation from each grading section, a series of screening and washing stations to which each group of peas of a different size are directed by the said gravity chutes, inclined vibrating screens at each of said washing stations, rotary means for imparting vibratory movement to said screens to give to each of said groups of peas a final screening and washing treatment to cleanse and remove undesirable matter therefrom with means for directing a liquid cleansing fluid onto the tops of said screens.

5. A unitary device for grading and washing green peas for canning purposes and for screening the graded peas to remove undesirable material therefrom comprising a series of pairs of grading cylinders each pair of said series having a plurality of grading sections to separate peas into groups of differing sizes and the same size to each group, said pairs of cylinders being arranged side by side in substantially parallel relation, each pair of said series being arranged in substantially end to end relation with one of the pair located on a slightly lower level than the other, means for delivering a mass of mixed grades of peas to the median ends of the upper of each pair of cylinders for an initial separation, gravity chute means for collecting the separated groups of peas and passing them to the median ends of the lower of each pair of cylinders, the said separated groups now passing along the several cylinders for further separation, chute means for collecting all of the peas of a size as separation takes place and delivering each collected group to a place of further treatment, a series of screening and washing stations to which said groups are delivered, vibrating screens at each of said stations adapted to handle only one size of pea, continuous rotary means for imparting reciprocating movement to said screens to cause separation of undesirable material from the previously screened groups with means for projecting a cleansing liquid onto said peas during this final separation or screening and washing treatment.

6. An apparatus for grading peas comprising a series of pairs of grading screen members each pair positioned in tandem relation, each pair lying in a horizontal plane and with one of each pair lying on a lower plane, intermeshing driving means connecting each of a pair, a single driving means extending transversely of the said pairs of screen members with intermeshing means for imparting simultaneous rotation to all of said screen members, rotary mountings for each of said screen members engaging their outer peripheries, and a series of collector conveyors for receiving each separated group, segregating groups of a like size and passing the groups to other places for treatment.

7. An apparatus for grading peas comprising a series of pairs of grading screens each pair positioned in tandem relation and lying in a horizontal plane with one of each pair lying on a lower plane, gear means connecting the adjacent ends of each pair, a transverse shaft carrying gear means meshing with the gear means on said screens to impart motion thereto, rotary means supporting said screens, a series of collector devices for receiving the groups of peas separated by said screens, segregating the peas of like sizes into said groups, a series of final screening devices to which said segregated groups are passed by said collecting devices for final treatment.

8. A unitary device for grading peas for size and for then screening said graded peas to separate undesirable matter therefrom comprising a series of horizontally arranged grading elements divided into upper and lower sections, motion imparting means connecting said upper and lower sections, drive means extending across said assembly at substantially right angles to said grading elements and connecting with said motion imparting means to move said grading elements in unison, chute means for collecting the various separations from the grading elements, segregating those of like size into individual groups, a series of final screening means for receiving the individual groups from said chute means, a separate screen for each group, means for agitating said groups to cause a separation of material therefrom, with means for spraying a liquid on said groups during agitation.

9. A unitary device for grading peas for size and for then screening said graded peas to separate undesirable matter therefrom comprising a series of pairs of horizontal grading elements arranged in tandem relation but in different axial planes, means for imparting screening motion to all of said elements, means for delivering mixed grades of peas from one of each pairs of elements of each series to the adjoining ends of associated elements of the same series for separation, the said peas moving axially with said grading elements during separation but in opposite directions, chute means for collecting the grades as separated and segregating those of like sizes into individual groups, a series of final screening means for receiving the groups from said chutes, means for agitating said screens and peas thereon and means for spraying a liquid thereon.

10. A unitary device for grading peas for size and for then screening said graded sizes to separate undesirable matter therefrom comprising a series of pairs of grading elements, horizontally disposed in tandem relation but in different axial planes thus divided into upper and lower grading sections one of which is adapted to grade the smaller sizes and the other to grade the larger sizes, means for imparting screening motion to all of said grading elements, means for delivering mixed grades of peas to the adjoining ends of each pair of associated elements to begin separation where an initial separation takes place in the upper section dividing the original mass into two groups of mixed sizes then continuing the separating but moving the groups in oposite directions, chute means for collecting the separations as they occur and for segregating the peas of like sizes into individual groups, final screening means for receiving the groups from the said chutes, rotary means for imparting agitation to said screens and peas thereon and means for spraying a liquid thereon.

11. A unitary device for dividing mixed masses of peas into groups, rescreening said groups into groups, and then treating each group separately to remove undesirable matter therefrom before discharging it from the apparatus comprising a series of pairs of tandem arranged rotary separating devices, means for rotating said devices, which conveys the original groups in opposite directions during further separation, a series of final treating means comprising reciprocating screening members arranged in lateral alignment and each adapted to treat a single size of pea, means for conveying the separated groups to said screening members, a single rotary means for imparting reciprocation to all of said screening members, and means for applying a liquid to peas while on said screening members.

In testimony whereof I affix my signature.
OGDEN S. SELLS.